United States Patent Office 3,690,906
Patented Sept. 12, 1972

3,690,906
CHROME PIGMENTS
Charles Harold Buckley, John Mitchell, and Geoffrey Lionel Collier, Manchester, England, assignors to Imperial Chemical Industries Limited, London, England
No Drawing. Filed Oct. 5, 1970, Ser. No. 78,153
Claims priority, application Great Britain, Oct. 13, 1969, 50,129/69
Int. Cl. C09c 1/20
U.S. Cl. 106—302                5 Claims

ABSTRACT OF THE DISCLOSURE

Chrome pigments of improved durability, especially to atmospheric sulphurous acid, are obtained by adding to a stirred aqueous suspension of a chrome pigment at an initial pH between 1.8 and 9.0 a source of silicate ions, a source of trivalent antimony ions, an alkali metal hydroxide, a polyhydric alcohol and a hydroxyalkylamine and adjusting the pH to between 3.0 and 7.0 by addition of an acidic compound.

---

This invention relates to chrome pigments of improved fastness properties and a method for their manufacture.

According to the invention there is provided a process for the manufacture of improved chrome pigments which comprises adding to a stirred aqueous suspension of a chrome pigment at an initial pH between 1.8 and 9.0 a source of silicate ions, a source of trivalent antimony ions, an alkali metal hydroxide, a polyhydric alcohol and a hydroxyalkylamine and adjusting the pH to between 3.0 and 7.0 by addition of an acidic compound.

As chrome pigments there are meant chrome yellows such as primrose chromes, lemon chromes and middle chromes, yellow shade molybdenum chromes, middle shade molybdenum chromes and blue shade molybdenum chromes.

The source of silicate ions may be a water-soluble silicate, for example sodium or potassium silicate or may be a compound which breaks down in presence of water to provide silicate ions. It is preferred that the amount of the source of silicate ions should be sufficient to provide silica calculated as $SiO_2$ in amount between 2 and 5% of the chrome pigment by weight. The particularly preferred proportion of silica is about 3.5% of the weight of pigment. Larger amounts of a source of silicate ions may be used but do not in general provide commensurate improvement in properties.

As as source of trivalent antimony ions there may be mentioned for example trivalent antimony compounds such as antimony trichloride and antimony sulphate. The amount of the source of trivalent antimony ions used should be sufficient to provide antimony calculated as $Sb_2O_3$ in amount from 2 to 5% and preferably about 3% of the weight of pigment. Larger amounts of a source of antimony ions may be used but do not in general provide a commensurate improvement in properties.

The alkali metal hydroxide may be for example sodium or potassium hydroxide. About 2 molar proportions of metal hydroxide are suitable for each atom of antimony. Smaller amounts may be used as long as sufficient to solubilise the antimony chloride in the polyhydric alcohol solution. Greater amounts confer no advantage and require additional acid at the neutralisation stage.

As polyhydric alcohols there are mentioned compounds, especially aliphatic compounds, containing two or more alcoholic hydroxyl groups, for example ethylene glycol, glycerol, mannitol, sorbitol, sucrose, lactose and glucose.

As hydroxyalkylamines, there are mentioned compounds, especially aliphatic compounds, containing at least one alcoholic hydroxyl group and at least one primary, secondary or tertiary amino group, for example triethanolamine, triisopropanolamine, N,N'-tetra-2-hydroxypropyldiaminoethane, tri - 2 - hydroxybutylamine, N-methyldiethanolamine, N,N' - tetra - 2 - hydroxyethyldiaminoethane, N,N' - tetra - 2 - hydroxyethyl diaminodecane.

The amount of polyhydric alcohol used may be from 1 to 10% of the weight of chrome pigment, but more can be used if desired.

The amount of hydroxyalkylamine used may be from 1 to 10% of the weight of chrome pigment, but more can be used if desired.

In contrast to the silicate and antimony ions which remain in the pigment product the polyhydric alcohol and hydroxyalkylamine do not appear in the final pigment product to any significant extent but remain in the aqueous medium. Without prejudice to the scope of this invention it is believed that the affect of the polyhydric alcohol and hydroxyalkylamine is to assist in obtaining a coating of antimony oxide on the surface of the pigment which coating is the cause of the increased fastness in the pigment.

The process may conveniently be carried out by adding an aqueous solution of a silicate to the pigment suspension at least in sufficient amount to bring the pH to greater than 7.0, then adding an aqueous solution of the antimony compound, the alkali metal hydroxide, polyhydric alcohol and hydroxyalkylamine, and bringing the pH to between 3.0 and 7.0 by the addition of an acid such as dilute sulphuric acid.

The pigment products obtained may be used in any conventional manner. For example they may be dispersed in paint media based on natural or synthetic resins such as short oil alkyds, long oil alkyds, formaldehyde/urea condensates, formaldehyde/melamine condensates, acrylic resins or isocyanate-modified alkyds. The paints obtained afford coatings of improved fastness especially to atmospheric sulphurous acid.

The invention is illustrated but not limited by the following examples in which all parts and percentages are by weight unless otherwise stated.

EXAMPLE 1

110 parts of lead nitrate are dissolved in 500 parts water at 45° C., the pH is adjusted to 3.0 and the solution is added with stirring over 30 minutes to a solution of 48.8 parts of sodium dichromate and 12.8 parts of sodium hydroxide in 1600 parts of water at 35° C., the precipitated pigment is washed twice by decantation. Sulphuric acid (about 1 part is necessary) dissolved in 10 parts of water is added to bring the pH to 1.8 and 11.0 parts of sodium silicate (30% $SiO_2$) dissolved in 100 parts of water are added with stirring (the pH rises to about 9.0) followed by a solution of 4.4 parts of antimony trichloride, 6.7 parts of triethanolamine, 3.4 parts of mannitol and 1.6 parts of sodium hydroxide in 40 parts of water. Sulphuric acid (about 2 parts are necessary) dissolved in 20 parts of water is added with stirring to bring the pH to 5.5. The pigment is collected by filtration, washed with water until free from electrolyte and dried at 70° C.

The pigment so obtained is dispersed by grinding in a ball mill with an alkyl/melamine-formaldehyde resin and applied to tin plate panels using a $10/1000$ inch applicator and allowed to cure. The panels and panels similarly prepared from pigments not treated as above are marked appropriately and placed in the Canning Apparatus (conforms to B.S. S. d224/1959) and subjected to the action of moist sulphur dioxide. The coatings containing the treated pigment show superior resistance to sulphur dioxide.

Pigments with similar properties are obtained by the above procedure using instead of the mannitol 3.4 parts of glucose, 13.0 parts of sucrose, 6.5 parts of lactose, 3.4 parts of sorbitol, 6.9 parts of ethylene glycol or 6.9 parts of glycerol.

EXAMPLE 2

The procedure of Example 1 with mannitol as the polyhydric alcohol is repeated using as hydroxyalkylamine 15.0 parts of N,N-tetra-2-hydroxypropylethylenediamine, 13 parts of triisopropanolamine, 11 g. parts of tri-2-hydroxybutylamine, 6.9 parts of methyldiethanolamine, or 13 parts of N,N-tetrahydroxyethylethylenediamine. Pigments are obtained with similar properties to those obtained in Example 1.

We claim:

1. A process for the manufacture of improved chrome pigments which comprises adding to a stirred aqueous suspension of a chrome pigment at an initial pH between 1.8 and 9.0 a water-soluble silicate, a trivalent antimony compound, and alkali metal hydroxide, a polyhydric alcohol and a hydroxyalkylamine and adjusting the pH to between 3.0 and 7.0 by addition of an acidic compound, the silicate providing silica in an amount between 2 and 5% of the weight of the chrome pigment, the trivalent antimony compound providing antimony calculated as $Sb_2O_3$ in an amount between 2 and 5% of the weight of the chrome pigment, the amount of polyhydric alcohol being from 1 to 10% of the weight of the chrome pigment and the amount of hydroxyl alkyl amine being from 1 to 10% of the weight of the chrome pigment.

2. The process of claim 1 wherein the silicate is sodium silicate and the trivalent antimony compound is antimony trichloride or antimony sulphate.

3. A process as claimed in claim 1 wherein in the first step an aqueous solution of a silicate is added to the pigment suspension at least in sufficient amount to bring the pH to more than 7.0

4. A process as claimed in claim 1 wherein the silica provided is 3.5% of the weight of chrome pigment.

5. A process as claimed in claim 1 wherein the antimony calculated as $Sb_2O_3$ provided is 3% of the weight of chrome pigment.

References Cited

UNITED STATES PATENTS 2,808,339  10/1957  Jackson _____ 106—302 X

FOREIGN PATENTS 156,371  5/1954  Australia _____ 106—302
1,123,995  8/1968  Great Britain _____ 106—302

TOBIAS E. LEVOW, Primary Examiner

H. M. S. SNEED, Assistant Examiner

U.S. Cl. X.R.

106—308 N, 308 Q